United States Patent [19]
Daniels

[11] Patent Number: 5,335,366
[45] Date of Patent: Aug. 2, 1994

[54] RADIATION SHIELDING APPARATUS FOR A RADIO TRANSMITTING DEVICE

[76] Inventor: John J. Daniels, 350 Bristol St. Unit A-1, Waterbury, Conn. 06708

[21] Appl. No.: 12,446
[22] Filed: Feb. 1, 1993
[51] Int. Cl.$^5$ ............................................. H04B 1/38
[52] U.S. Cl. ......................................... 455/89; 455/90; 455/117; 455/128; 455/129; 379/59; 379/437; 379/447; 343/702; 343/841
[58] Field of Search ............... 455/89, 90, 95, 100, 455/117, 128, 129; 343/702, 718, 841; 379/58-59, 437, 447

[56] References Cited

U.S. PATENT DOCUMENTS

| | | | |
|---|---|---|---|
| 2,490,782 | 12/1949 | Collup | 343/841 |
| 2,599,944 | 6/1952 | Salisbury | 343/841 |
| 3,196,442 | 7/1965 | Leffelman et al. | 343/841 |
| 4,189,730 | 2/1980 | Murdock | 343/841 |
| 4,471,493 | 9/1984 | Schober | 455/89 |
| 4,845,772 | 7/1989 | Metroka et al. | 455/90 |
| 5,170,173 | 12/1992 | Krenz et al. | 455/89 |

FOREIGN PATENT DOCUMENTS

| | | | |
|---|---|---|---|
| 0056524 | 3/1986 | Japan | 455/89 |
| 0054630 | 2/1990 | Japan | 455/90 |
| 4127723 | 4/1992 | Japan | 379/58 |

OTHER PUBLICATIONS

"Detecting Microwave-Radiation Hazards", 1961, Electronics World, vol. 65, No. 6, pp. 31-33 and 78-79.
"McCaw to Study Cellular Phones as Safety Questions Affect Sales" Wall St. Journal, Jan. 29, 1993.

Primary Examiner—Reinhard J. Eisenzopf
Assistant Examiner—Andrew Faile
Attorney, Agent, or Firm—John J. Daniels

[57] ABSTRACT

A radiation shielding apparatus for a radio transmitting device, such as a cellular phone. A radiation shield is disposed between a radiation component and a user to prevent unwanted exposure of the user to emanating radiation from the radiation emanating component. The cellular telephone radio transmitting device may be a hand-held cellular telephone, and the radiation emanating component may be an internal or external antenna or any other electromagnetic radiation source, such as a transmitter. The radiation shield can be retrofitted to an existing cellular telephone; or may be designed specific for different models of cellular phones. The radiation shield can absorb, block and/or reflect electromagnetic wave radiation to shield the user of such cellular telephones from unwanted and possibly harmful exposure to electromagnetic wave radiation.

6 Claims, 8 Drawing Sheets

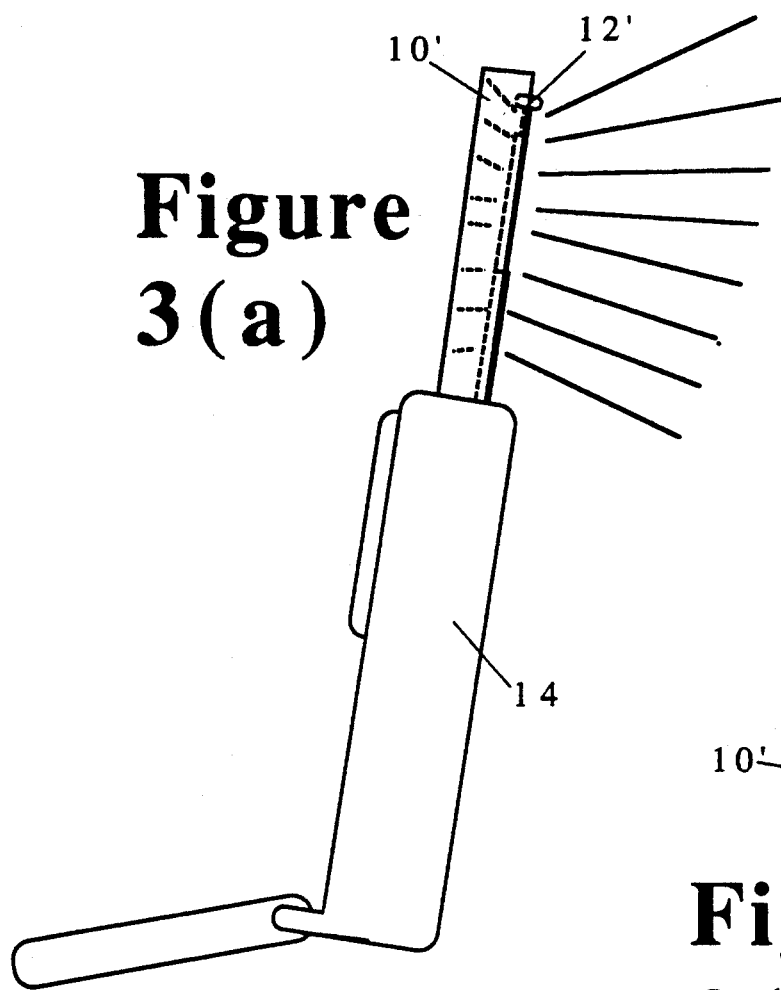
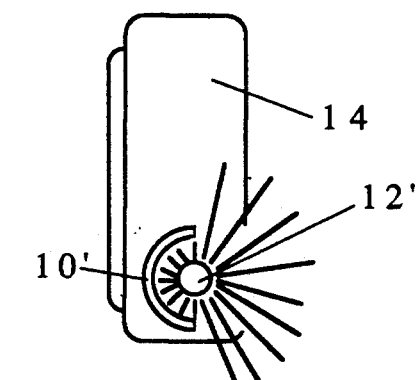
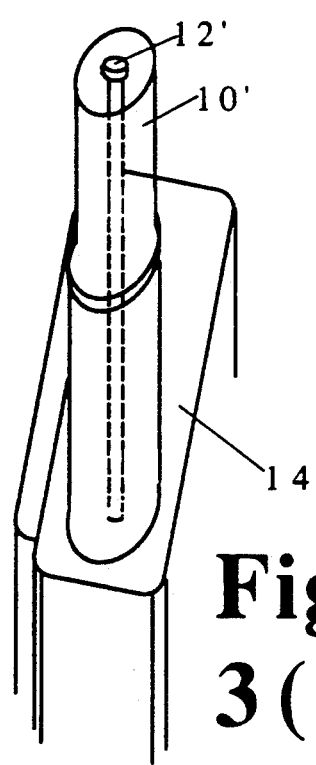
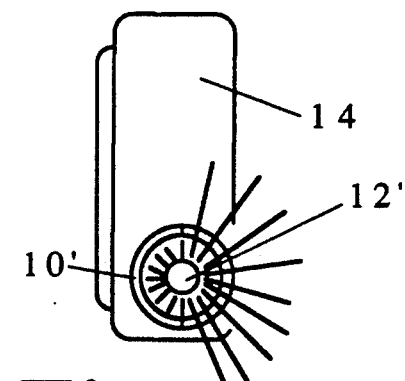
Figure 3(a)
Figure 3(b)
Figure 3(c)
Figure 3(d)

RADIATION SHIELDING APPARATUS FOR A RADIO TRANSMITTING DEVICE

BACKGROUND OF THE INVENTION

The present invention pertains to a radiation shielding apparatus for a radio transmitting device. More particularly, the present invention pertains to a radiation shielding apparatus for protecting a user from radiation generated by a hand-held cellular phone.

It is well known to shield circuitry from electromagnetic wave radiation by providing a layer of electromagnetic wave shielding material between an electromagnetic wave source and circuitry to be protected. Conventionally, such shielding is provided to prevent the influence of electromagnetic wave noise from affecting the protected circuit.

Cellular radio telephones have recently become well known devices. A cellular radio telephone is generally a portable unit for communication over hard wire phone lines by transmitting electromagnetic wave signals between the mobile cellular phone and stationary transmission/reception units known as "cells". These cells are connected with the hard wired telephone network, usually through a direct mechanical link. Thus, a user of a cellular phone is not confined by the traditional limitations of being mechanically linked with the hard wired telephone network. Rather, the user of a cellular phone has mobility due to the radio transmission of the electromagnetic wave signals between the cellular phone and the cells, and is able to communicate via the hard wired telephone network as long as the cellular phone is within range of an appropriate cell.

The cellular frequency typically used is between 800 and 900 megahertz. In other words, in order to communicate via the cellular telephone, the cellular telephone receives electromagnetic wave radiation in the frequency range between 800 and 900 megahertz from a cell, and also transmits electromagnetic wave radiation at this frequency range to the cell.

The transmission from the portable cellular telephone is traditionally accomplished through an antenna. In one configuration of a cellular telephone, known as a car phone, the transmitting/receiving unit is fixed at a location in the car, usually the trunk. The antenna in this configuration is fixed to the exterior of the car to facilitate reception and transmission of electromagnetic wave signals. The car phone also has a hand set disposed at an accessible location for the user. Usually, the hand set is disposed in the passenger cabin and is mechanically and electrically linked to the antenna by a mechanical and electrical link with the transmitting/receiving unit of the car phone. Thus, in this configuration the user has minimal exposure to the electromagnetic waves generated by the car phone. The transmitting/receiving unit of the car pone, which may be a source of electromagnetic wave radiation exposure, is at a relatively safe distance from the user in the trunk. The antenna of the car phone, which transmits the electromagnetic wave radiation, is also at a relatively safe distance at a portion of the exterior of the car. Furthermore, the metal construction of the car acts to shield the user from the electromagnetic wave radiation.

In another configuration of a cellular phone, known as a transmobile phone, the transmitting/receiving unit is carried in a bag, and an antenna fixed to the transmitting/receiving unit transmits the electromagnetic wave radiation necessary for communication. Again, the hand set, which the user places against her head to hear and to speak, is disposed separate from the electromagnetic wave generating components of the cellular phone such as the transmitting/receiving unit and the antenna. Furthermore, when used within a car, a second antenna may be used which is disposed outside the vehicle to facilitate reception and transmission of the electromagnetic waves.

In a third configuration of a cellular phone, known as a hand-held cellular phone, the transmitting/receiving unit and antenna are provided in the interior and/or disposed on an outside surface of the handset. In other words, in the hand-held cellular phone, the transmitting/receiving unit, hand set (including a mouthpiece and an earpiece) and the antenna are provided in a single compact unit. This type of cellular phone has steadily increased in popularity because of the convenience and mobility afforded by its compact structure. Traditionally, these cellular phones transmit at a cellular frequency range between 800 and 900 megahertz and at a power any where from less than one to six or more watts.

When using the hand-held cellular phone, the user places the hand set to his head so that his ear is in contact with the earpiece, and his mouth is at a location close to the mouthpiece. The antenna, which usually extends from the top surface of the hand set, transmits and receives the electromagnetic wave radiation. It is also well known to provide an internal antenna within the hand set to make the hand-held cellular phone even more compact. The electromagnetic wave radiation transmitted by the antenna is generated by a transmitter disposed in the interior of the hand set. Therefore, the user is in close proximity to the source of transmission of electromagnetic wave radiation, and the head and brain of the user receives direct exposure of this electromagnetic wave radiation generated by the hand-held cellular phone.

FIG. 7 shows a typical configuration for a hand-held cellular phone, commonly known as a "flip phone". This conventional cellular phone has a main phone body 1 having an earpiece 2 disposed thereon. A mouthpiece 3 shown in the closed position is flipped downward so that when the hand-held cellular phone is appropriately positioned by a user, the earpiece 2 is adjacent to the user's ear, while the mouthpiece 3 is adjacent to the user's mouth. An antenna 4, which may be telescoping or fixed, is disposed externally on the phone body 1. Alternatively or additionally, an antenna 4 may be internally disposed. The antenna 4 emits electromagnetic wave radiation to send communication signals from the hand-held cellular phone to a distant cell of a cellular network and receives electromagnetic radiation carrying communication signals from the cell. Thus, the user is able to communicate through the cellular network to the hard wire telephone network.

However, as shown in FIG. 8, internal radiation emanating components 5, and the external antenna 4 emit radiation which exposes the user to the health risks now being associated with exposure to electromagnetic wave radiation in the cellular frequency band. Furthermore, it is possible that the electromagnetic wave radiation emanating from the hand-held cellular phone or some other emanating radiation from the hand-held cellular phone is causing the recently observed health problems. However, at the present time the exact cause of the health risks is not known. But, it is apparent that there is great demand for a means to shield the users of hand-held cellular phones from unwanted, and possibly harmful, exposure to the radiation generated by the cellular phone.

The extent of the danger seems to be as yet not known. In fact, there seems to be a deficiency in research on health effects of electromagnetic fields, particularly those emitted by portable phones in the cellular frequency band-800 to 900 millions of cycles per second or megahertz. The cellular phone industry has done studies which target the thermal effects of electromagnetic fields. However, apart from thermal effects, recent tests have shown that radio waves around the cellular frequency band can damage the resilient blood-brain barrier, which protects the brain from toxins. Furthermore, radio frequencies, including the European cellular frequency, have been shown to damage the calcium coating in cells that regulates the passage of hormonal "messages" between cells. Some scientist believe that the brain tissue absorbs some of the power of the electromagnetic radiation. The exact empirical health risks which can be directly linked to the cellular phone are still not known. However, it is apparent that the users and future purchasers of cellular phones are demanding a means to protect themselves as much as possible from exposure to the radiation generated by the cellular phone.

Very recently, serious questions have arisen regarding the safety of users exposed to the cellular phone electromagnetic wave radiation. It has also been suggested that such exposure, particularly due to the use of a hand-held cellular phone, has contributed to the occurrence of cancer and brain tumors in the brains of users of cellular phones. It has recently been speculated that the electromagnetic wave radiation transmitted by the hand-held cellular phone has a detrimental effect on the blood-barrier when a user is exposed to electromagnetic wave radiation around the cellular frequency. It has further been suggested that the electromagnetic wave radiation generated by the cellular phone has a detrimental effect on calcium contained by body cells and disrupts the functioning of such cells. These serious concerns have prompted widespread consternation by users of cellular telephones. In fact, due to the concern over the effects of exposure to the electromagnetic wave radiation generated by the cellular phone, the future of the "wireless' communication industry has very recently been questioned.

Therefore, there is an urgent need in the cellular telephone art to provide a means for protecting users of cellular phones, particularly, hand-held cellular phones, from unnecessary and possibly harmful exposure to the electromagnetic wave radiation generated by the cellular telephone. However, the conventional art merely provides electromagnetic wave shielding to protect internal circuitry from the noise influence of background radiation. There is no conventional device which is effective for protecting a user of cellular phones from unwanted exposure to electromagnetic wave radiation generated during use of the cellular phone.

SUMMARY OF THE INVENTION

The present invention is intended to overcome the drawbacks of the conventional art. It is an object of the present invention to provide a radiation shielding apparatus for a radio transmitting device which can shield a user from unwanted exposure to radiation emanating from a radiation emanating component of a radio transmitting device. It is another object of the present invention to provide a radiation shield for an antenna of a radio transmitting device, such as a hand-held cellular telephone, for preventing unwanted exposure of a user of the hand-held cellular telephone to radiation emanating from a radiation emanating antenna, while allowing transmission of the emanating radiation so that the hand-held cellular telephone is effective for communication.

In accordance with the present invention, a radiation shielding apparatus for a radio transmitting device has shielding means disposed between a radiation emanating component and a user for preventing unwanted exposure of the user to emanating radiation from the radiation emanating component. The radiation emanating component may be an external antenna, or other electromagnetic radiation source, which may also be disposed in the interior of the radio transmitting device. The antenna may be either an internal antenna disposed in the interior of the radio transmitting device, or an external antenna, which is disposed on the exterior of the radio transmitting device.

The shielding means may be a radiation shield dimensioned to be retrofitted to an existing radio transmitting device. The shielding means may be effective to reflect electromagnetic radiation, block and/or absorb electromagnetic radiation.

The radio transmitting device may be a cellular phone radio, in particular a hand-held cellular phone. Alternatively, the radio transmitting device may be a radio transmitting computer modem, fax machine or the like. In the case of these devices, such as a hand-held cellular phone a transmitter for transmitting electromagnetic radiation in a cellular frequency band may be included. The cellular frequency band is conventionally between 800 and 900 megahertz. The device, such as a hand-held cellular phone may have an internal or external antenna which transmits electromagnetic radiation in the cellular frequency band (or other electromagnetic frequency). Thus, the shielding means is effective to shield the user of the hand-held cellular phone from electromagnetic radiation emanating from either an external antenna, internal antenna, or other electromagnetic wave transmitter of, for example, a cellular phone.

In accordance with the present invention, a radiation shield is provided for an antenna of a radio transmitting device. Shielding means, disposed between a radiation emanating antenna and a user, prevents unwanted exposure of the user to emanating radiation from the radiation emanating antenna, while allowing transmission of the emanating transmission so that the cellular phone is effective for communication. The shielding means may be an elongated member disposable between the antenna and the user. The elongated member may be curved so as to wrap at least partially around a radius of radiation emanating from the antenna. Thus, the radiation emanating from the antenna toward the user is shielded from the user, and radiation emanating from the antenna not toward the user can be transmitted so that the cellular phone is effective for communication. The elongated member may be telescoping and have fixing means for fixing the elongated member at a position adjacent to the antenna. Thus, the inventive shielding means may be retrofitted to an existing cellular phone so that cellular phones already purchased can be made safe in view of the recently discovered potential health hazards due to exposure to electromagnetic wave radiation around the cellular frequency band. The elongated member may be an electromagnetic wave absorber, blocker and/or reflector. Furthermore, the shielding means may be one of an electromagnetic wave absorber, blocker, and/or reflector which is integrally disposed on the antenna. In this case, the shielding means may be a coating, a material adhered to an antenna by an adhesive, or applied in other suitable fashion. Furthermore, antennas so equiped may be provided in the after-purchase market of the hand-held cellular phones so that existing cellular phones can be safely used, while shielding the user from unwanted exposure to electromagnetic wave radiation.

BRIEF DESCRIPTION OF THE DRAWINGS

FIG. 3(a) shows an embodiment of the radiation shield for an antenna of a radio transmitting device comprised of an elongated member disposed adjacent to an external antenna of a cellular phone;

FIG. 3(b) is a top plan view of the elongated member radiation shield shown in FIG. 3(a) showing the elongated member having an open curve construction;

FIG. 3(c) is a partial perspective view of a cellular phone showing an elongated member constructed as a sheath encompassing an external antenna of the cellular phone;

FIG. 3(d) is a top plan view of the elongated member radiation shield shown in FIG. 3(c);

DETAILED DESCRIPTION OF THE DRAWINGS

Figure 1:
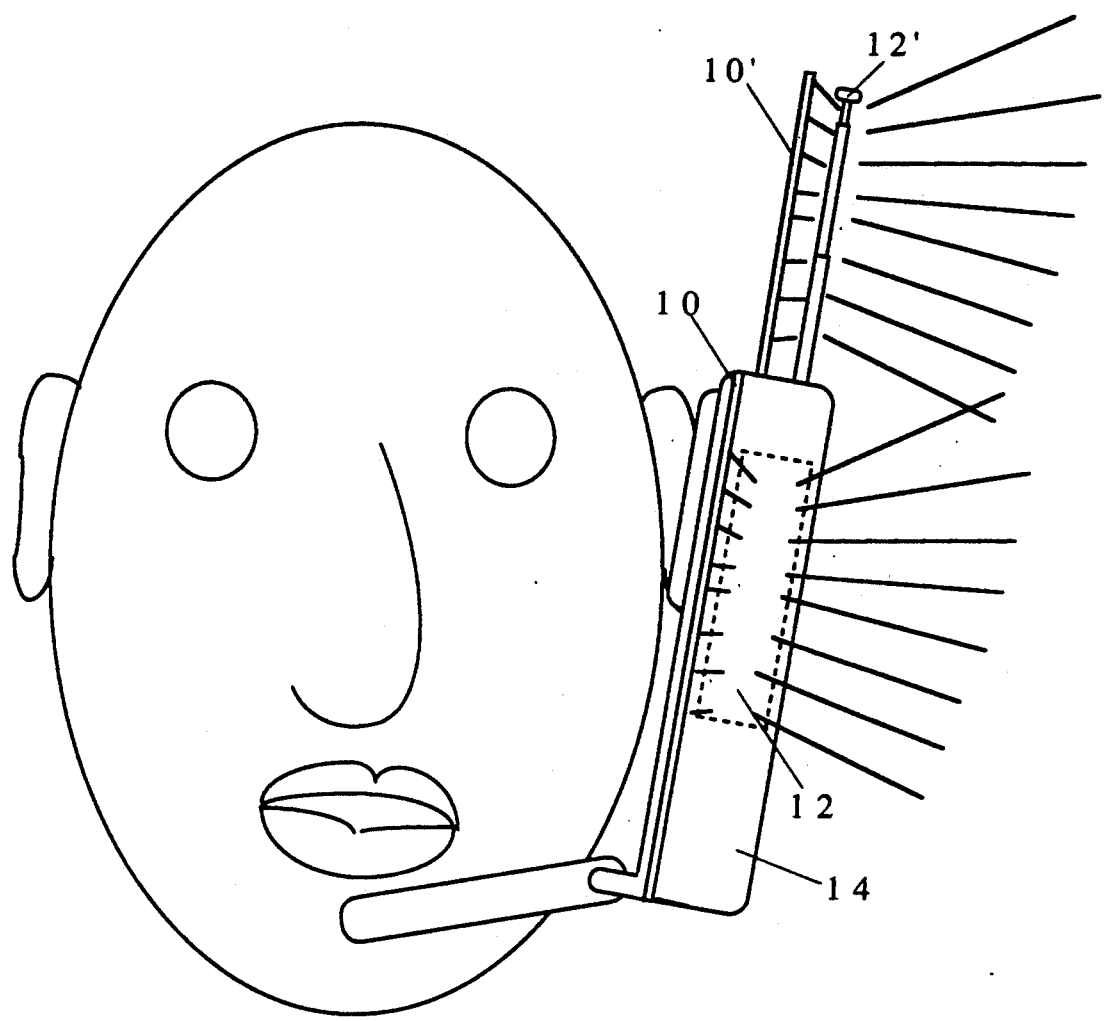
FIG. 1 is a view showing a hand-held cellular phone having the inventive shielding means for shielding an electromagnetic radiation source disposed in the interior of the cellular phone and and shielding means for shielding electromagnetic wave radiation from an external antenna disposed on the outside of the cellular phone.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Referring to FIG. 1, an embodiment of the inventive radiation shielding apparatus for a radio transmitting device is shown. In this case, the radio transmitting device comprises a hand-held cellular phone. However, the radio transmitting device may be any other radio transmitting system in which a source of potentially harmful electromagnetic radiation is disposed close to the body of the user. In this case, the exact configuration of the radiation shield may vary depending on what type of component is being shielded. However, such alterations are expressly within the scope of the present invention.

As shown in FIG. 1, shielding means 10 is disposed between a radiation emitting component 12 (external antenna 12' and and interiorly disposed electromagnetic radiation source 12) and a user to prevent unwanted exposure of the user to radiation emanating from the radiation emitting component 12. The antenna 12' may be an external antenna 12' disposed on the exterior of the radio transmitting device, or an internal antenna disposed in the interior of the radio transmitting device 14. The shielding means 10 may be a radiation shield 10' which is dimensioned to be retrofitted to an existing radio transmitting device 14. For example, to shield the user from electromagnetic radiation emanating from an interior radiation emitting component 12, such as a transmitter within an existing cellular phone without such shielding, a preformed sheet member, comprising an electromagnetic wave radiation reflector, blocker and/or absorber, may be disposable within the interior of the existing cellular phone at a position effective to shield emanating electromagnetic wave radiation from exposing the user. Alternatively, the radiation shield may be more generic and can be cut and bent into a shape so that it can be disposed within the interior of an existing cellular phone at a position where it is effective for its intended use. Although a cellular phone is shown, the radiation emitting component may be a part of a radio transmitting computer modem, fax transmission device, or other radio transmission device.

Shielding means 10 may be disposed within a hand-held cellular phone to prevent exposure of a user from radiation emanating from a transmitter within the phone. In the case of a typical cellular phone, the transmitter transmits radiation in a cellular frequency band conventionally between 800 and 900 megahertz. Therefore, the material comprising the shielding means 10 is composed of a material effective to block, absorb or reflect electromagnetic wave radiation within this band range. However, since other frequency ranges may be emitted by different radio transmitting devices, the appropriate type and dimensions of the material of the shielding means 10 should be selected accordingly.

Figure 2A:
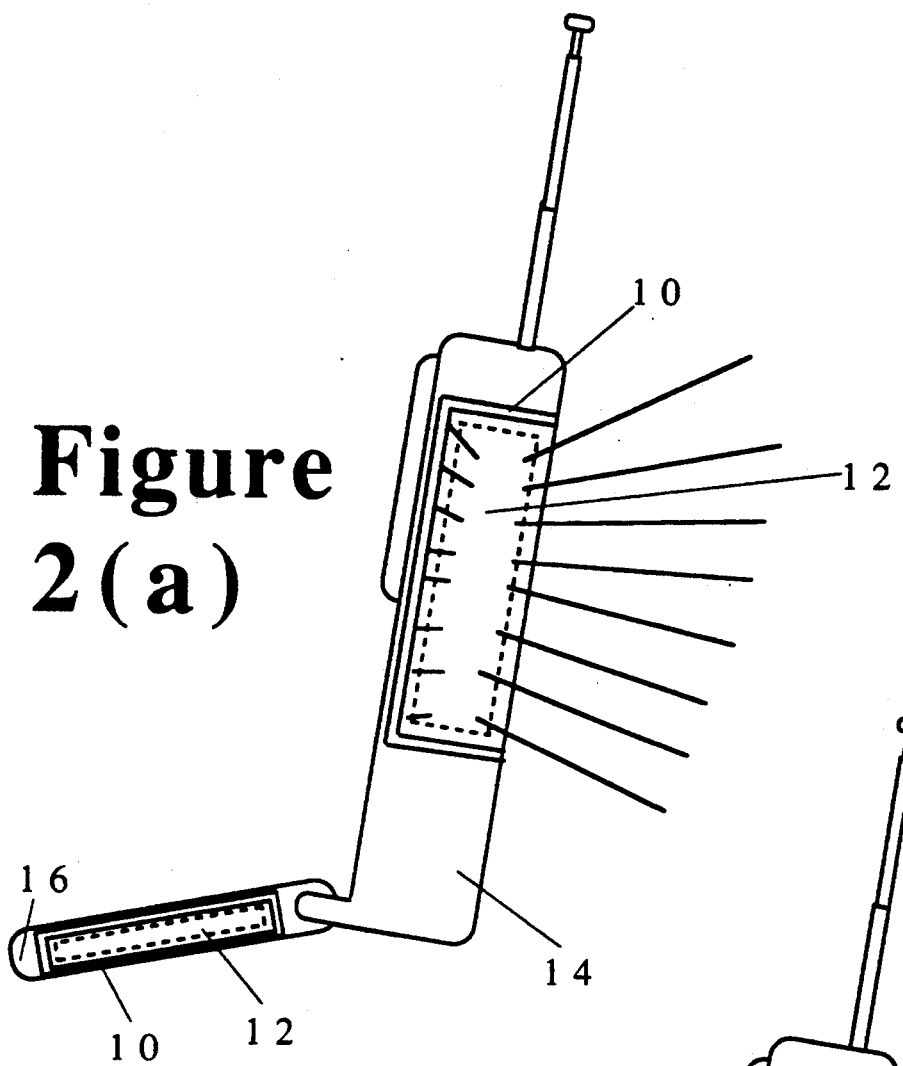
FIG. 2(a) is an illustration of an embodiment of the inventive radiation shielding apparatus shown shielding radiation emanating from an interiorly disposed radiation source in the body of the cellular phone and a radiation source disposed in the mouthpiece of the cellular phone.
Figure 2B:
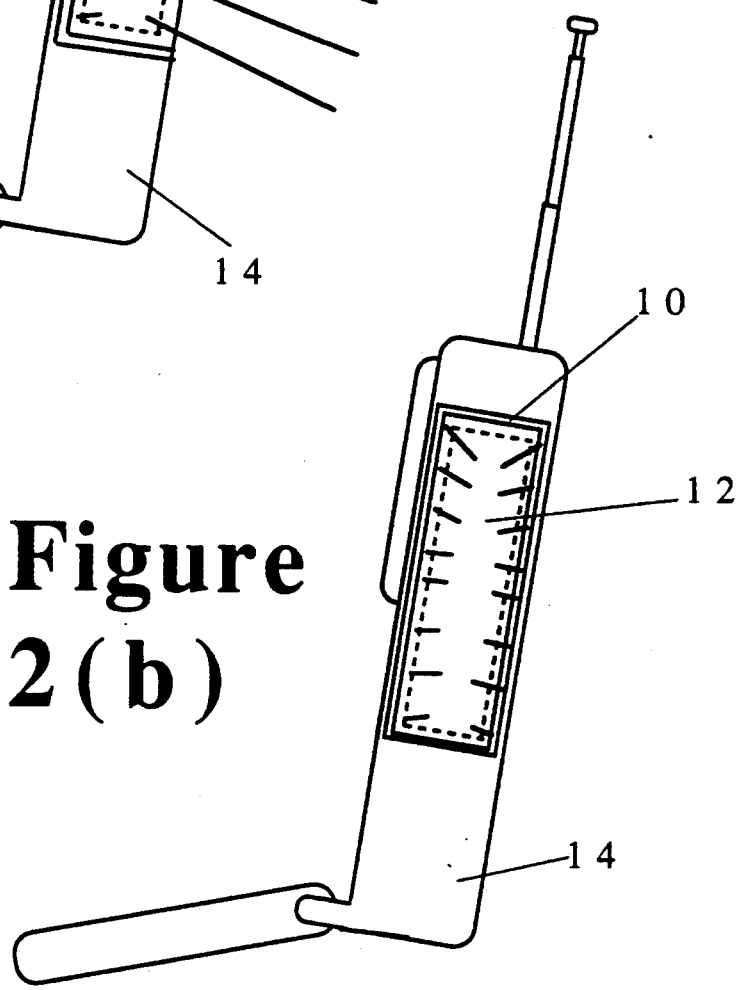
FIG. 2(b) is a view showing an embodiment of the inventive radiation shielding apparatus shown shielding an interiorly disposed radiation source of a cellular phone so that no unwanted radiation emanates from the radiation source.

Referring now to FIGS. 2(a) and 2(b), alternative configurations of the shielding means 10 is shown shielding interiorly disposed electromagnetic wave radiation sources of a hand-held cellular phone. These configurations represent two shielding states, one in which the interiorly disposed electromagnetic radiation source 12 is partially shielded and the other in which the interiorly disposed electromagnetic radiation source 12 is fully shielded. As shown in FIG. 2(a), the interiorly electromagnetic radiation source 12 which may be a transmitter within the body of the cellular phone, is shielded so that electromagnetic wave radiation travelling in a direction towards the user is blocked, absorbed or reflected. In this embodiment, the electromagnetic wave radiation may still be transmitted from the hand-held cellular phone so that communication with a distant cell of a cellular network is possible. This configuration can be used to shield an internal electromagnetic wave transmitter, such as an internal antenna disposed in the interior of a hand-held cellular phone radio transmitting device 14, in which case the external antenna may or may not be present. Also, as shown, if other portions contain electromagnetic wave radiation sources, such as in the mouthpiece 16, these components may be shielded to prevent unwanted exposure of the user. As shown in FIG. 2(b), an interiorly disposed transmitter may be fully shielded so that no harmful electromagnetic wave radiation generated by such a transmitter can expose the user. In this case, an external antenna 12' disposed on the exterior of the hand-held cellular phone radio transmitting device 14 is typically used for transmission of electromagnetic wave radiation. In which case, the external antenna 12' has appropriate shielding for preventing exposure of the user to electromagnetic wave radiation as described herein.

Referring now to FIG. 3(a) and 3(e), a radiation shield for an antenna 12' of a radio transmitting device 14 is shown. In this embodiment, shielding means 10 is disposed between a radiation emitting antenna 12' and a user for preventing unwanted exposure of the user to emanating radiation from the radiation emanating antenna 12' while allowing transmission of the emanating radiation so that communication between the hand-held cellular phone and a distant cell of a cellular network is possible. The radiation emanating antenna 12' comprises at least one of an internal antenna 12' disposed in the interior of the radio transmitting device 14 (represented by the interiorly disposed electromagnetic radiation sources, shown for example, in FIG. 2) and an external antenna 12' disposed on the exterior of the hand-held cellular phone radio transmitting device 14 as shown in FIG. 3. The antenna 12' transmits electromagnetic radiation in a cellular frequency band, typically between 800 and 900 megahertz. The shielding means 10 comprises an electromagnetic radiation reflector, blocker and/or absorber.

In the configuration shown in FIGS. and 3(b), the shielding means 10 comprises an elongated member 10' disposable between the antenna 12' and the user. The elongated member 10' has an open curve construction so as to wrap partially around a radius of radiation emanating from the antenna 12' (shown in FIG. 3(b)) so that radiation emanating from the antenna 12' toward the user is shielded from the user while radiation emanating from the antenna 12' not toward the user can be transmitted to allow communication between the hand-held cellular phone radio transmitting device 14 and a distant cell of a cellular network.

In the configuration shown in FIGS. 3(c) and 3(d), the shielding means 10 comprises an elongated member 10' disposable between the antenna 12' and the user. The elongated member 10' has a closed curve construction so as to sheath the antenna 12' and wrap completely around a radius of radiation emanating from the antenna 12' (shown in FIG. 3(d)). The side of the elongated member 10' closest to the user comprises a material which shields the user from radiation emanating from the antenna 12' toward the user. The other side of the elongated member 10' allows radiation emanating from the transmitter to pass, so that communication is possible. This side may comprise a material which does not prevent transmission of the emanating radiation, or may have a construction, such as through-holes, which allows transmission. In the case of this side being metal, it may by in direct electrical contact with the antenna 12' so as to become a radiation emanating component 12. This configuration can be easily slipped over an existing cellular phone antenna and may be clipped, clamped or fastened to the antenna 12' at an orientation effective to shield the user from harmful exposure while allowing transmission of electromagnetic radiation necessary to allow communication.

Figure 4A:
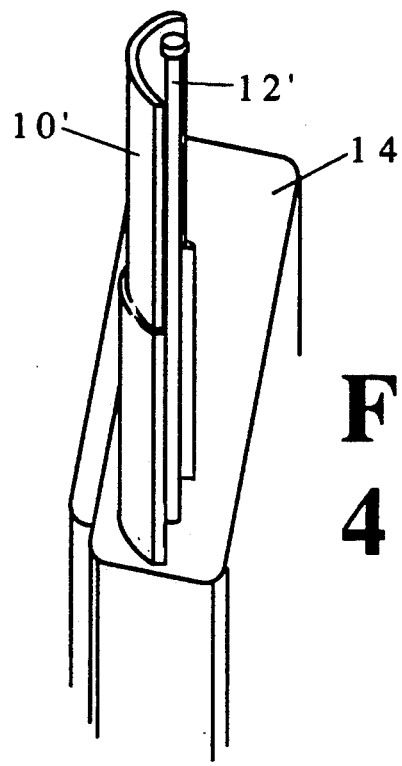
FIG. 4(a) is a partial perspective view of a cellular phone showing a telescoping elongated member disposed adjacent to an external antenna.
Figure 4B:
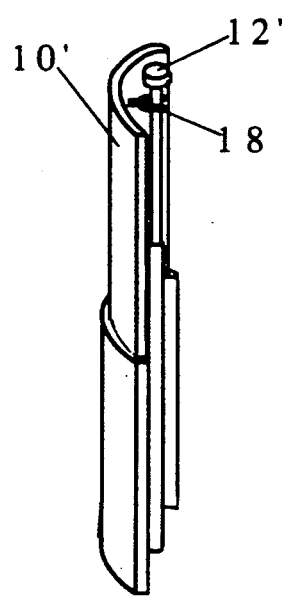
FIG. 4(b) is a view of the telescoping elongated member having an antenna top clip attached to an external antenna of a cellular phone.

As shown in FIG. 4(a) and 4(b), the elongated member 10' radiation shield for an antenna 12' may comprise at least two telescoping portions so as to be telescoping between an extended and a retracted position. This construction may also comprise a radiation shield elongated member 10' having different cross sectional configurations. For example, it may take the form of an open or closed boxed shape, open or closed curve, or a flat planar member. Fixing means shown in FIG. 4(b)–4(f) is provided for fixing the radiation shield to either the body of the hand-held cellular phone or to the antenna 12'. For example, as shown in FIG. 4(b), an antenna top clip 18 extending from the top portion of the telescoping elongated member 10' radiation shield clips onto the top portion of a telescoping antenna 12'. The base of the radiation shield may have fixing means for attaching the base to the antenna 12' base and/or the body of the hand-held cellular phone. Thus, the telescoping radiation shield may be extended and retracted in conjunction with the telescoping antenna 12'. In the case of a fixed antenna 12', the radiation shield may be disposed so that it is also non-telescoping or still can be a telescoping member. Other construction of the shielding means 10 will lend to alternative constructions of the fixing means. For example, the shielding means may be configured as a sheath disposable over the antenna 12' and capable of blocking or reflecting radiation in a particular harmful frequency range, while allowing transmission of other radiation for communication.

Figure 4C:
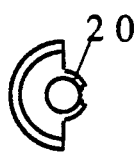
FIG. 4(c) shows one embodiment of fixing means for attaching the inventive antenna shield to the antenna by an antenna base clip.
Figure 4D:
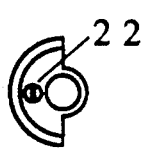
FIG. 4(d) is an embodiment of fixing means of the inventive antenna shield for attaching the antenna shield to the cellular phone by a screw.
Figure 4E:
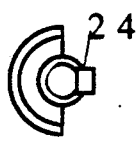
FIG. 4(e) is an embodiment of fixing means of the inventive antenna shield having an clamp for fixing the antenna shield to an external antenna of a cellular phone.
Figure 4F:
FIG. 4(f) is an embodiment of the fixing means of the inventive antenna shield showing the use of an adhesive for fixing the antenna shield to the hand-held cellular phone.

As shown in FIG. 4(c), the fixing means may comprise an antenna base clip 20 which clips onto the antenna 12' at the antenna base. A more permanent radiation shield fixing means is shown in FIG. 4(d) in which the base of the radiation shield is fixed by a screw 22 screwed to the body of the hand-held cellular phone radio transmitting device 14. In FIG. 4(e), the base of the radiation shield is clamped, by a clamp represented by box 24, to the base of the antenna 12', by a clamp and in FIG. 4(f), the bottom surface of the base of the radiation shield is fixed to the body of the hand-held cellular phone radio transmitting device 14 by an adhesive 26. It is noted that these examples of the fixing means are in no way exhaustive, and many other configurations would be readily apparent to one of ordinary skill in the art.

Figure 5:
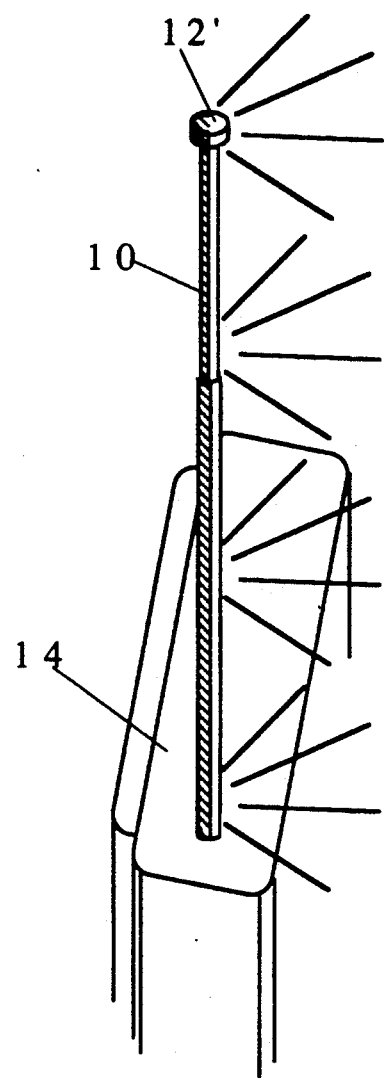
FIG. 5 is a partial perspective view of a hand-held cellular phone having radiation shielding integrally disposed on an external antenna.

FIG. 5 shows another embodiment of the inventive radiation shield for an antenna 12'. In this embodiment, the shielding means 10 comprises at least one of an electromagnetic wave absorber, reflector and/or blocker which is integrally disposed on the antenna 12'. As shown, the shielding means 10 may comprise a radiation shielding coating applied to a portion, for example along the longitudinal length, of the antenna 12' to one side thereof. Thus, a portion of the antenna 12' is still effective for transmitting electromagnetic wave radiation to a distant cell of a cellular network. However, electromagnetic wave radiation directed toward the user is effectively blocked to thereby prevent possible harmful effects of such exposure to electromagnetic wave radiation. It is noted that many existing hand-held cellular phone radio transmitting device 14 are provided with detachable antennas, and as such, the inventive radiation shield integrally disposed on a retro-fittable antenna 12' may be provided so that the existing hand-held cellular phone radio transmitting device 14 is still usable by merely switching antennas. In the case of a radiation blocking shielding coating, a material such as lead can be applied and integrally fixed to the antenna.

Figure 6A:
FIG. 6(a) shows a construction of the radiation shield comprising a substrate supporting a radiation reflector.
Figure 6D:
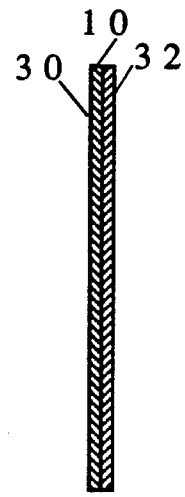
FIG. 6(d) shows a construction of the radiation shield comprising a radiation reflector and radiation absorber and/or blocker.
Figure 6B:
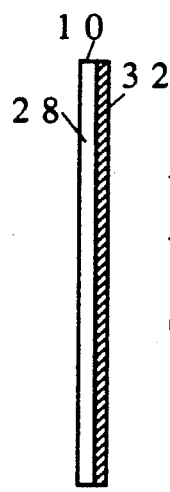
FIG. 6(b) shows a construction of the radiation shield comprising a substrate supporting a radiation absorber and/or blocker.
Figure 6E:
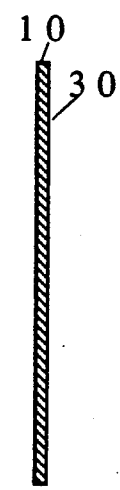
FIG. 6(e) shows a construction of the radiation shield comprising just a radiation reflector.
Figure 6C:
FIG. 6(c) shows a construction of the radiation shield comprising a substrate supporting a radiation reflector and radiation absorber and/or blocker.
Figure 6F:
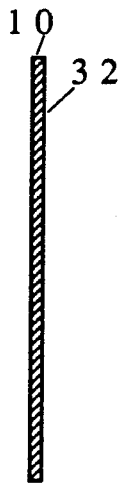
FIG. 6(f) shows a construction of the radiation shield comprising just a radiation absorber and/or blocker.
Figure 7:
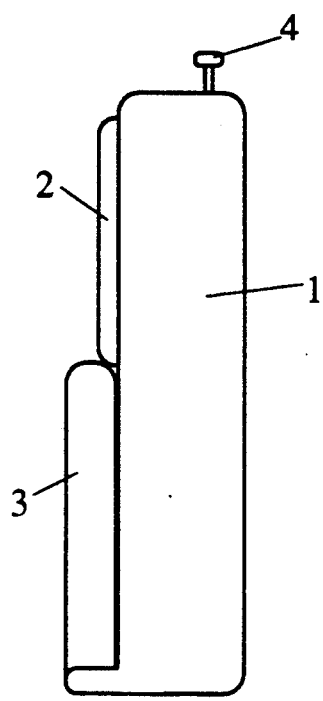
FIG. 7 shows the configuration of a conventional hand-held cellular phone.
Figure 8:
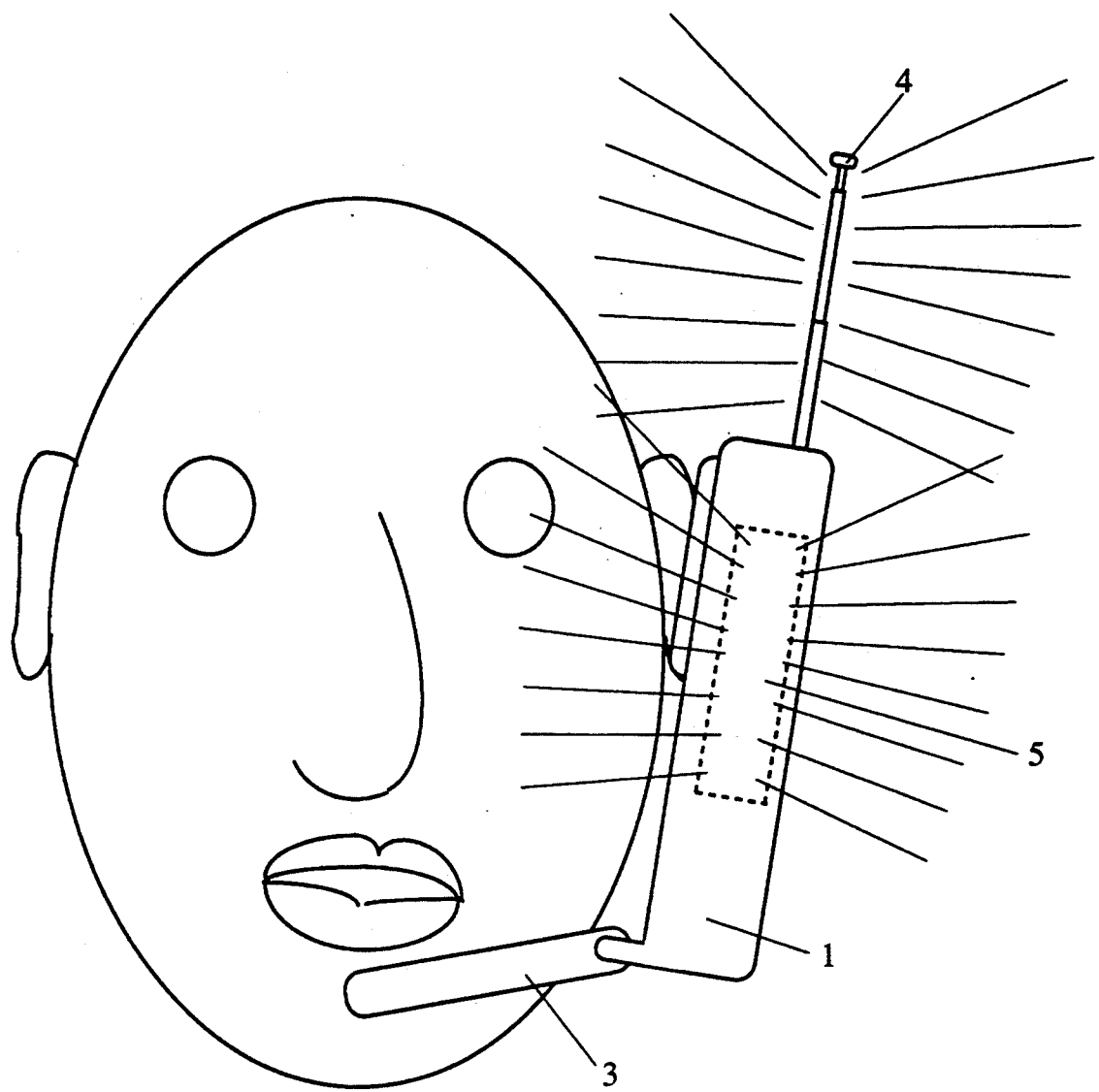
FIG. 8 shows the conventional hand-held cellular phone in use.

FIGS. 6(a)-6(f) show various configurations for the inventive shielding means 10. As shown in FIG. 6(a), the shielding means 10 may comprise a substrate 28, such as metal, polymer, fiberglass or other suitable material, having a radiation reflector 30, such as aluminum, other metal, polymer or other suitable material disposed thereon. As shown in FIG. 6(b), the substrate 28 may have a radiation absorber and/or blocker 32, such as lead, or other suitable material disposed thereon. As shown in FIG. 6(c), the substrate 28 may have both a radiation reflector 30, a radiation absorber and/or a radiation blocker 32(or other combination) disposed thereon. As shown in FIG. 6(d), the shielding means 10 may comprise a radiation reflector 30 and a radiation absorber and/or radiation blocker 32 formed together in a self supporting structure. As shown in FIG. 6(e), the shielding means 10 may simply be a radiation reflector 30 comprised of a material capable of being self supporting. Similarly, as shown in FIG. 6(f), the shielding means 10 may comprise a radiation absorber and/or blocker 32 which is also self supporting thereby obviating the need for an additional substrate 28.

The shielding material can be formed on the antenna in a variety of process. For example, a shielding material can be spray coated at appropriate portions of an antenna. Alternatively, the shielding material can be formed by sputtering, vacuum deposition, dip coating or any other suitable process. The shielding means 10 can be made to block the electromagnetic radiation emanating from the electromagnetic source, such as the antenna 12', and toward the user. For example, a material which presents a relatively dense block to the passage of electromagnetic radiation, such as lead, can be used.

The shielding means 10 can be made to reflect the electromagnetic radiation emanating from the electromagnetic source, such as the antenna, and toward the user. For example, a polished material, such as aluminum, provides high reflectance. The elongated member 10' may be shaped to optimize the advantages of directing the reflected electromagnetic waves. For example, a parabolic shape with a highly reflective surface, will direct the waves to a focus.

On the other hand, it may be advantageous to reflect the waves at diffusing angles so that they spread out and reflect off of nearby surfaces so as to provide a more non-uniformity of the transmission direction. This is advantageous since the cell may be in a direction from the antenna in line with the user's head. In this case, the shielding means 10 might attenuate transmission of electromagnetic waves if the waves are directed and focused in the opposite direction. However, by diffusing (or scattering) the direction of the electromagnetic radiation, communication with such a cell may be improved.

The shielding means 10 can be made to absorb the electromagnetic radiation so that radiation emanating towards the user is absorbed and does not expose the user to the potential harmful effects of the electromagnetic radiation.

Further, a combination of one or more layers of reflecting, absorbing and blocking material can be used to provide an optimum radiation field. In any case, the material selected can be such that the radiation exposure of the user is minimized by selecting appropriate materials to "tune" to the anticipated radiation frequency range.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A radiation shielding apparatus in combination with a cellular telephone radio transmitting device having a radiation emanating external antenna for transmission of electromagnetic radiation, said radiation shielding apparatus comprising: shielding means comprising an elongated member having a closed-curve cross sectional shape so as to wrap completely around the antenna of the cellular telephone device, a side of the elongated member closest to a user of the cellular telephone device comprising a first material which shields the user from radiation emanating from the antenna toward the user and an other side of the elongated member comprising a second material for allowing the radiation emanating from the antenna to pass, and fixing means for disposing, fixing and maintaining the elongated member at an operable position between the antenna and the user of the cellular telephone device so that at the operable position the elongated member is effective to prevent exposure of the user to the radiation during all transmissions of electromagnetic radiation from the radiation emanating antenna.

2. A radiation shielding apparatus according to claim 1; wherein the side of the elongated member closest to the user comprises at least one of a radiation blocking material, a radiation reflecting material and a radiation absorbing material.

3. A radiation shielding apparatus according to claim 1; wherein the fixing means further includes means for fixing and maintaining the elongated member at only a fixed position relative to the user of the cellular telephone radio transmitting device so that at the fixed position the elongated member prevents exposure of the user to the radiation from the radiation emanating antenna.

4. A radiation shielding apparatus according to claim 1; wherein the elongated member comprises at least two telescoping portions.

5. A method of shielding a user of a cellular telephone radio transmitting device having a radiation emanating external antenna for transmission of electromagnetic radiation, comprising the steps of: providing an elongated member having a closed-curve cross sectional shape so as to wrap completely around the antenna of the cellular telephone device, and having a side made from a first material for blocking radiation emanating from the antenna and an other side for allowing radiation emanating from the antenna to pass to prevent exposure of the user to the radiation from the external antenna; and disposing the elongated member between the antenna and the user so that the elongated member prevents exposure of the user to radiation during transmissions of the electromagnetic radiation from the radiation emanating antenna.

6. A method of shielding a user of a cellular telephone radio transmitting device according to claim 5; further comprising the step of providing means for retracting the elongated member.

* * * * *